(12) United States Patent
Hunt et al.

(10) Patent No.: US 10,745,310 B2
(45) Date of Patent: Aug. 18, 2020

(54) DEWATERING SYSTEMS AND METHODS

(71) Applicant: Process Wastewater Technologies, LLC, Rosedale, MD (US)

(72) Inventors: Edwin R. Hunt, Joppa, MD (US); Robert A. Hawkins, Louisville, KY (US); Corey T. Whitehead, Columbia, MD (US)

(73) Assignee: Process Wastewater Technologies, LLC, Rosedale, MD (US)

( * ) Notice: Subject to any disclaimer, the term of this patent is extended or adjusted under 35 U.S.C. 154(b) by 0 days.

(21) Appl. No.: 16/040,001

(22) Filed: Jul. 19, 2018

(65) Prior Publication Data

US 2019/0023598 A1 Jan. 24, 2019

Related U.S. Application Data

(60) Provisional application No. 62/534,582, filed on Jul. 19, 2017.

(51) Int. Cl.
*C02F 11/121* (2019.01)
*B01D 29/60* (2006.01)
(Continued)

(52) U.S. Cl.
CPC .......... *C02F 11/121* (2013.01); *B01D 29/356* (2013.01); *B01D 29/60* (2013.01);
(Continued)

(58) Field of Classification Search
None
See application file for complete search history.

(56) References Cited

U.S. PATENT DOCUMENTS 4,078,262 A * 3/1978 Meunier ................. C22B 1/205
366/152.5
6,126,821 A 10/2000 Corcoran
(Continued)

FOREIGN PATENT DOCUMENTS

| DE | 10115179 A1 | 10/2002 |
|---|---|---|
| EP | 0839859 A2 | 5/1998 |
| JP | 8-19707 | * 1/1996 |

OTHER PUBLICATIONS

Invitation to Pay Additional Fees amd Partial Search Report dated Sep. 26, 2018 issued in corresponding International Application No. PCT/US2018/042851.
(Continued)

*Primary Examiner* — Chester T Barry
(74) *Attorney, Agent, or Firm* — Locke Lord LLP; Alicia J. Carroll

(57) ABSTRACT

A dewatering system for removing solids from an influent includes a filtration assembly and a feed pipe upstream thereof. The dewatering system includes a solids receptacle downstream of the filtration assembly, and an effluent collector adjacent to the filtration assembly and in fluid communication with the filtration assembly. The dewatering system includes a sensor to sense a characteristic of an influent, an effluent and/or a solid. A control system is operatively connected to the sensor to receive a sensor signal therefrom and to generate an adjustment signal based on the sensor signal to improve the efficiency of the dewatering system.

19 Claims, 3 Drawing Sheets

(51) Int. Cl.
| | |
|---|---|
| *B01D 29/35* | (2006.01) |
| *B01D 33/29* | (2006.01) |
| *C02F 11/125* | (2019.01) |
| *B01D 29/82* | (2006.01) |
| *B01D 33/46* | (2006.01) |
| *C02F 1/52* | (2006.01) |
| *C02F 11/14* | (2019.01) |

(52) U.S. Cl.
CPC ........... *B01D 29/828* (2013.01); *B01D 33/29* (2013.01); *B01D 33/466* (2013.01); *C02F 11/125* (2013.01); *C02F 1/5209* (2013.01); *C02F 11/14* (2013.01); *C02F 2209/001* (2013.01); *C02F 2209/003* (2013.01); *C02F 2209/005* (2013.01); *C02F 2209/03* (2013.01); *C02F 2209/10* (2013.01); *C02F 2209/11* (2013.01); *C02F 2209/40* (2013.01); *C02F 2209/42* (2013.01)

(56) References Cited

U.S. PATENT DOCUMENTS

| | | | |
|---|---|---|---|
| 6,143,183 A * | 11/2000 | Wardwell | B04B 1/20 210/143 |
| 6,581,783 B2 | 6/2003 | Blanche et al. | |
| 6,615,710 B1 * | 9/2003 | Ishigaki | B01D 29/118 100/111 |
| 7,150,826 B2 | 12/2006 | Buckett | |
| 7,465,391 B2 | 12/2008 | Heist et al. | |
| 7,964,064 B2 * | 6/2011 | Weinstein | D21F 3/02 162/198 |
| 9,207,228 B2 | 12/2015 | Saarenmaa et al. | |
| 9,387,641 B2 * | 7/2016 | Kaneko | B01D 29/35 |
| 2003/0111421 A1 * | 6/2003 | Abu-Orf | C02F 1/5209 210/709 |
| 2005/0167372 A1 | 8/2005 | Heist et al. | |
| 2005/0263448 A1 | 12/2005 | Heist et al. | |
| 2009/0255876 A1 * | 10/2009 | Dunbar | C02F 1/008 210/709 |
| 2013/0042795 A1 * | 2/2013 | Dangtran | F23G 5/006 110/224 |
| 2013/0330707 A1 * | 12/2013 | Krifuks | C12M 41/48 435/3 |
| 2014/0326148 A1 * | 11/2014 | Wootton | B30B 9/125 100/37 |
| 2016/0250570 A1 * | 9/2016 | Hunt | B01D 33/04 210/105 |

OTHER PUBLICATIONS

International Search Report and Written Opinion dated Nov. 16, 2018 issued in PCT/US2018/042851.

* cited by examiner

DEWATERING SYSTEMS AND METHODS

CROSS-REFERENCE TO RELATED APPLICATIONS

This application claims the benefit of priority to U.S. Provisional Patent Application No. 62/534,582 filed Jul. 19, 2017, which is incorporated by reference herein in its entirety.

BACKGROUND OF THE INVENTION

1. Field of the Invention

The subject disclosure relates to dewatering systems, and more particularly to sludge dewatering systems.

2. Background of the Related Art

In general, a dewatering system for wastewater acts to separate solids and liquids from one another in order to prepare both the solids and liquids for further processing. Dewatering apparatuses typically include a mechanical or mechanical/electrical filtration system that drives influent through a filter to separate the solids and liquids from one another. These mechanical or mechanical/electrical filtration systems include, but are not limited to screw presses, centrifuges, ring presses, filter presses, plate and frame presses, rotary presses, or the like. One example of these dewatering systems is described in U.S. Pat. No. 9,387,641, which is incorporated herein by reference in its entirety.

Traditional dewatering systems have been considered satisfactory for their intended purpose. However, there is an ongoing need for dewatering systems that are more efficient.

SUMMARY OF THE INVENTION

As will be discussed in greater detail below in the Detailed Description section of this disclosure, the present disclosure is directed to a dewatering system for removing solids from an influent. The dewatering system includes a filtration assembly and a feed pipe upstream thereof. The dewatering system includes a solids receptacle downstream of the filtration assembly, and an effluent collector adjacent to the filtration assembly and in fluid communication with the filtration assembly. The dewatering system includes a sensor to sense a characteristic of an influent, an effluent and/or a solid. A control system is operatively connected to the sensor to receive a sensor signal therefrom and to generate an adjustment signal based on the sensor signal to improve the efficiency of the dewatering system.

It is envisioned that the dewatering system can include a feed pump, a valve, and/or a weir operatively connected to the feed pipe to draw influent into the influent storage receptacle.

In certain preferred constructions, the sensor is operatively connected to a conduit upstream from the filtration assembly and downstream from the feed pipe. The sensor can be a light sensor used to measure an amount of suspended solids in the influent, a degree of homogeneity in the influent, a degree of flocculation of the solids in the influent, and/or a size of flocculated solid nodules in the influent.

In some embodiments, the sensor is operatively connected to the feed pipe and measures a density, an amount of suspended solids, and/or a flow rate of an influent.

In some embodiments, the sensor is operatively connected to an influent storage receptacle upstream from the filtration assembly and downstream of the feed pipe. The sensor can be a level sensor, a turbidity sensor and/or a reflectivity sensor.

In accordance with some embodiments, the sensor is operatively connected to the filtration assembly to measure either pressure and/or strain.

It is contemplated that in some embodiments, the filtration assembly includes a drum, an auger positioned within the drum, and a series of spaced apart plates. The sensor can measure pressure and/or strain of the drum, one or more of the spaced apart plates or the auger.

The sensor can be operatively connected to the solids receptacle. The sensor can measure solid content, moisture content, density, and/or permissivity to energy of solids in the solids receptacle.

The sensor can be operatively connected between the filtration assembly and the solids receptacle. The sensor can measure solid content, moisture content, density, and/or permissivity to energy.

It is contemplated that the sensor can be operatively connected to the effluent collector. The sensor can measure an amount of suspended solids, turbidity, color, density, and/or interruption of a light or laser beam in the effluent discharged from the filtration assembly.

In accordance with some embodiments, the dewatering system includes a motor operatively connected to the filtration assembly. The sensor can be operatively connected to the motor. The sensor can measure torque, amperage draw, rotational speed, temperature and/or power factor of the motor.

It is contemplated that the system can include multiple additional sensors in one embodiment such that additional sensors can be positioned in more than one of the locations described above.

In accordance with another aspect, the present disclosure is directed to a method for adjusting a dewatering system that removes liquid from an influent. The method includes determining a characteristic of at least one of an influent, an effluent or a solid in a dewatering system. The method includes adjusting an operating parameter of the dewatering system based on the characteristic of at least one of the influent, the effluent or the solid in the dewatering system.

In accordance with some embodiments, adjusting a chemical dosing provided to the dewatering system, and/or adjusting an influent feed rate from an influent storage receptacle to the filtration assembly downstream from the influent storage receptacle.

Adjusting the operating parameter of the dewatering system can also include adjusting the speed of an element in a filtration assembly downstream from an influent storage receptacle.

Adjusting the operating parameter of the dewatering system can include adjusting the feed rate of an influent to the dewatering system through an influent feed pipe by adjusting (i) the speed of a feed pump operatively connected to the influent feed pipe, (ii) the opening or closing of a valve operatively connected to the influent feed pipe, and/or (iii) the raising or lowering of a weir operatively connected to the influent feed pipe.

It is envisioned that in certain constructions, determining the characteristic of an influent includes receiving a signal from a sensor operatively connected to an influent feed pipe, an influent storage receptacle, and/or a conduit. The sensor can be a light sensor, level sensor, density sensor, and/or flow rate sensor.

In accordance with some embodiments, the method includes determining a characteristic of a filtration assembly downstream from a conduit by receiving signal from a sensor operatively connected to a filtration assembly. The signal can be indicative of stress and/or strain. Adjusting the operating parameter of the dewatering system can include adjusting an operating parameter based on the characteristic of the filtration assembly.

It is contemplated that determining a characteristic of the solid includes determining a characteristic of the solid in a solids receptacle downstream from the conduit. The sensor can measure at least one of solid content, moisture content, density, or permissivity to energy, of the solid in the solids receptacle. Adjusting the operating parameter of the dewatering system can include adjusting the operating parameter based on the characteristic of the solid in the solids receptacle.

It is contemplated that determining a characteristic of the influent includes measuring torque, amperage draw, rotational speed, temperature and/or power factor of a motor operatively connected to the dewatering system.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those having ordinary skill in the art to which the present disclosure pertains will more readily understand how to employ the systems and methods of the present disclosure, embodiments thereof will be described in detail below with reference to the drawings, wherein.

These and other aspects of the subject disclosure will become more readily apparent to those having ordinary skill in the art from the following detailed description of the invention taken in conjunction with the drawings.

DETAILED DESCRIPTION OF PREFERRED EMBODIMENTS

Disclosed herein are detailed descriptions of specific embodiments of the dewatering systems of the present invention. It will be understood that the disclosed embodiments are merely examples of the way in which certain aspects of the invention can be implemented and do not represent an exhaustive list of all of the ways the invention may be embodied. Indeed, it will be understood that the systems, devices and methods described herein may be embodied in various and alternative forms. Moreover, the figures are not necessarily to scale and some features may be exaggerated or minimized to show details of particular components.

Well-known components, materials or methods are not necessarily described in great detail in order to avoid obscuring the present disclosure. Any specific structural and functional details disclosed herein are not to be interpreted as limiting, but merely as a basis for the claims and as a representative basis for teaching one skilled in the art to variously employ the invention.

Figure 3:
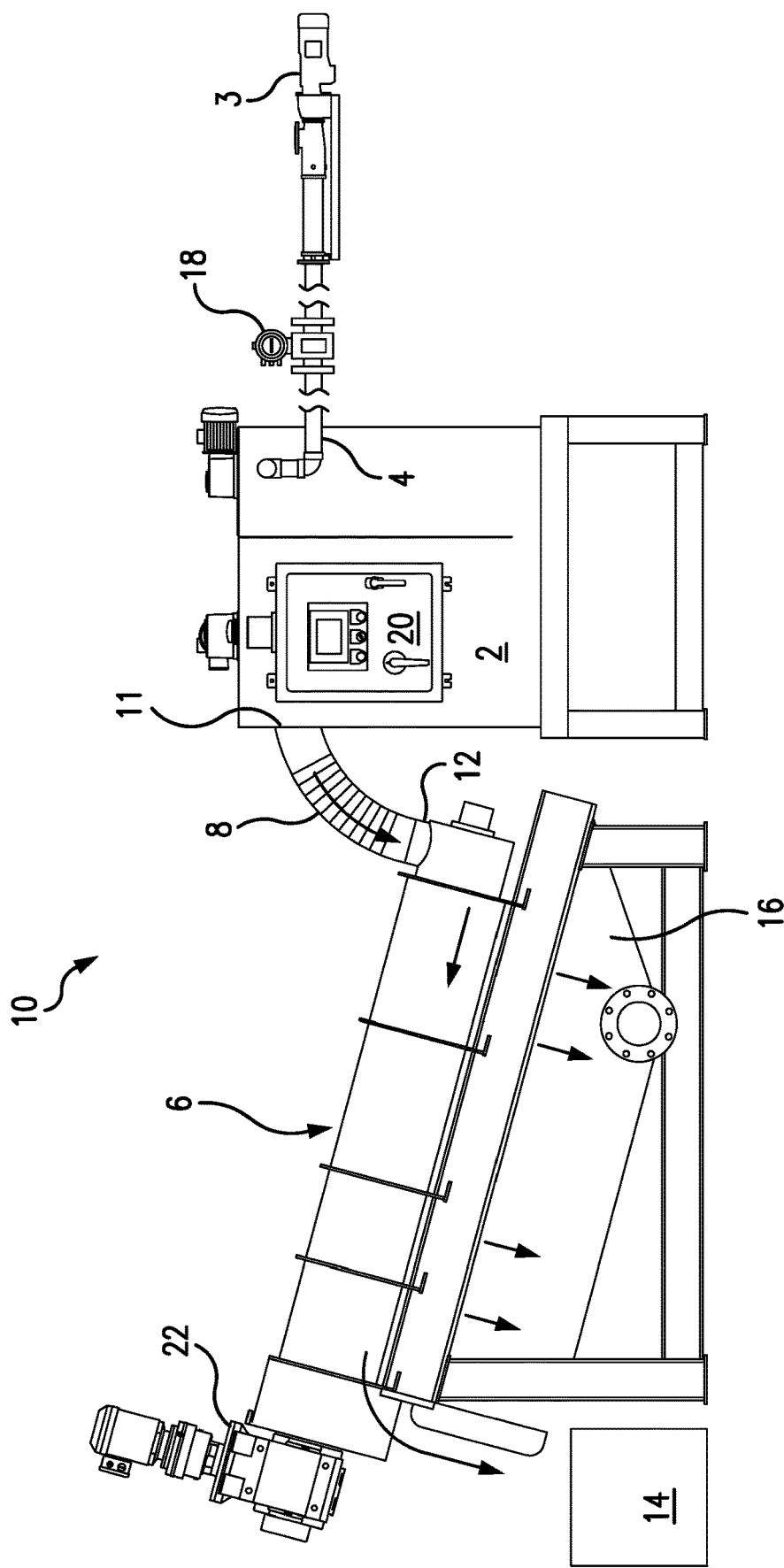
FIG. 3 is a graphical illustration of an embodiment of a traditional dewatering system constructed without use of the automatically adjustable controls described in the present disclosure, showing an influent storage receptacle and filtration assembly.

FIG. 3 is a graphical illustration of an embodiment of a traditional dewatering system 10 constructed without use of the automatically adjustable control, as described in the embodiments of the present invention. System 10 includes an influent storage receptacle 2 having a feed pipe 4 upstream thereof, and a filtration assembly 6 downstream of influent storage receptacle 2. Dewatering system 10 includes a feed pump 3 operatively connected to feed pipe 4 to draw influent into influent storage receptacle 2. Filtration assembly 6 is in fluid communication with influent storage receptacle 2 via a conduit 8 extending between an outlet 11 of influent storage receptacle 2 and an inlet 12 of filtration assembly 6. A motor 22 drives filtration assembly 6. A solids receptacle 14 is downstream of filtration assembly 6. An effluent collector 16 is adjacent to and downstream of filtration assembly 6 in fluid communication with filtration assembly 6. A control system 20 is connected to system 10. A flow rate sensor 18 is connected to feed pipe 4.

Figure 1:
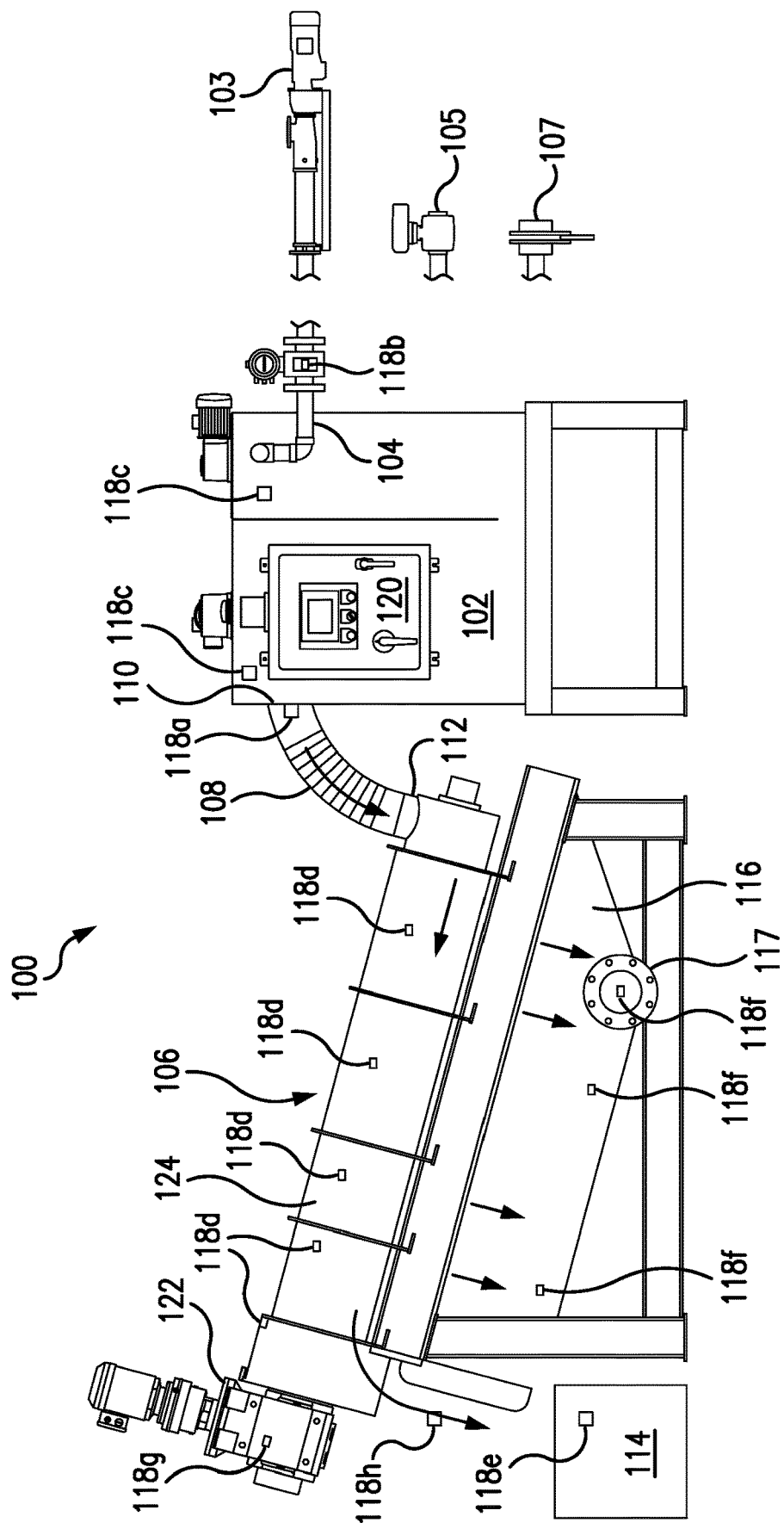
FIG. 1 is a graphical illustration of an embodiment of a dewatering system constructed in accordance with the present disclosure, showing the influent storage receptacle and the filtration assembly.

Referring now to FIG. 1, there is illustrated an automatically adjustable dewatering system 100 for removing solids from an influent. Dewatering system 100 includes an influent storage receptacle 102 having a feed pipe 104 upstream thereof, and a filtration assembly 106 downstream of influent storage receptacle 102. Dewatering system 100 includes a feed pump 103 operatively connected to feed pipe 104 to draw influent into influent storage receptacle 102. It is also contemplated that a valve 105, and/or a weir 107 can be operatively connected to feed pipe 104 to draw influent into the influent storage receptacle 102. Filtration assembly 106 is in fluid communication with influent storage receptacle 102 via a conduit 108 extending between an outlet 110 of influent storage receptacle 102 and an inlet 112 of filtration assembly 106. It is contemplated that conduit 108 can be a hose, pipe, tube, pump, or other means of transporting the influent directly into the mechanical or chemical/mechanical filtration assembly 106. It is also contemplated that the influent can be stored in a location removed from the aforementioned filtration assembly 106. The influent may be gravity fed, pumped or otherwise conveyed into the mechanical or chemical/mechanical filtration assembly 106. Filtration assembly 106 acts to remove solids from the influent and generates a solid output and a filtrate or effluent output 117. Those skilled in the art will readily appreciate that while the drawings show a screw press, it is contemplated that filtration assembly 106 can include a variety of mechanical or chemical/mechanical filtration systems, for example, a centrifuge, a ring press, a filter press, a plate and frame press, a rotary press, or the like.

With continued reference to FIG. 1, a solids receptacle 114 is downstream of filtration assembly 106. An effluent collector 116 is adjacent to and downstream of filtration assembly 106 in fluid communication with filtration assembly 106. Sensors 118a-h are operatively connected to components of dewatering system 100 to sense various characteristics of the system 100. Sensors 118a-c are used to determine the quantity of liquids, solids, combined liquids and solids, or liquids and solids separately, all of which are also referred to as influent, that are awaiting filtration by filtration assembly 106. Sensors 118 may include but are not limited to contact or noncontact level sensors, pressure sensors, infrared, ultrasonic or microwave solids meters, turbidity or light sensors, or some combination thereof.

Sensors 118*a-h* allow for continuous automatic control over dewatering system 100, which, in turn, assists in making the system 100 more efficient.

A control system 120 is operatively connected to sensors 118*a-h* to receive at least one sensor signal therefrom and to generate an adjustment signal based on the sensor signal to improve the efficiency of the dewatering system. Control system 120 is also connected to one or more elements of dewatering system 100 to send the adjustment signal thereto. For example, control system 120 is operatively connected to at least one of feed pump 103 and a motor 122, described below, to adjust power of motor 122 or the speed of feed pump 103. Control system 120 can be physically separate from filtration system 106 and receptacle 102 and can be in wireless communication with sensors 118*a-h* and other components of system 100. Moreover, in some embodiments, dewatering system 100 may accept regularly shifting flow rates from a feed pump not under control of control system 120 and compensate for them, may accept an outside requirement to increase or decrease overall system throughput and adjust system running parameters to compensate, or it may alter the feed rate to produce better performance.

Control panel 120 will contain one Programmable Logic Controller (PLC), industrial computer, microprocessor/microcontroller device such as a Raspberry Pi or Arduino, or other computing device that will be used to execute all decision-making functions to interpret the signals from sensors 118*a-h*, operate the dewatering system 100, and make all adjustments to operating system 100 based on the signals from sensors 118*a-h*. By having everything contained within a single control panel 120 the cost of implementation can be reduced by up to an order of magnitude and reduces or eliminates entirely the typical errors caused by requiring two dissimilar computing devices to share control of one dewatering system.

Sensor 118*a* is operatively connected to the conduit 108 and is a light sensor used to measure an amount of suspended solids in the influent; this includes a turbidity sensor, an interruption of light sensor, or laser beam sensor. Sensor 118*b* is operatively connected to feed pipe 104 and measures a density, turbidity, an amount of suspended solids, and/or a flow rate. Sensor 118*c* is operatively connected to influent storage receptacle 102. Sensor 118*c* is a level sensor, turbidity sensor and/or reflectivity sensor. It is also contemplated that conduit 108, feed pipe 104 and storage receptacle 102, can include multiple sensors 118*a*, 118*b*, and 118*c*, respectively, where each measures a respective parameter, e.g. density, an amount of suspended solids, or a flow rate.

Figure 2:
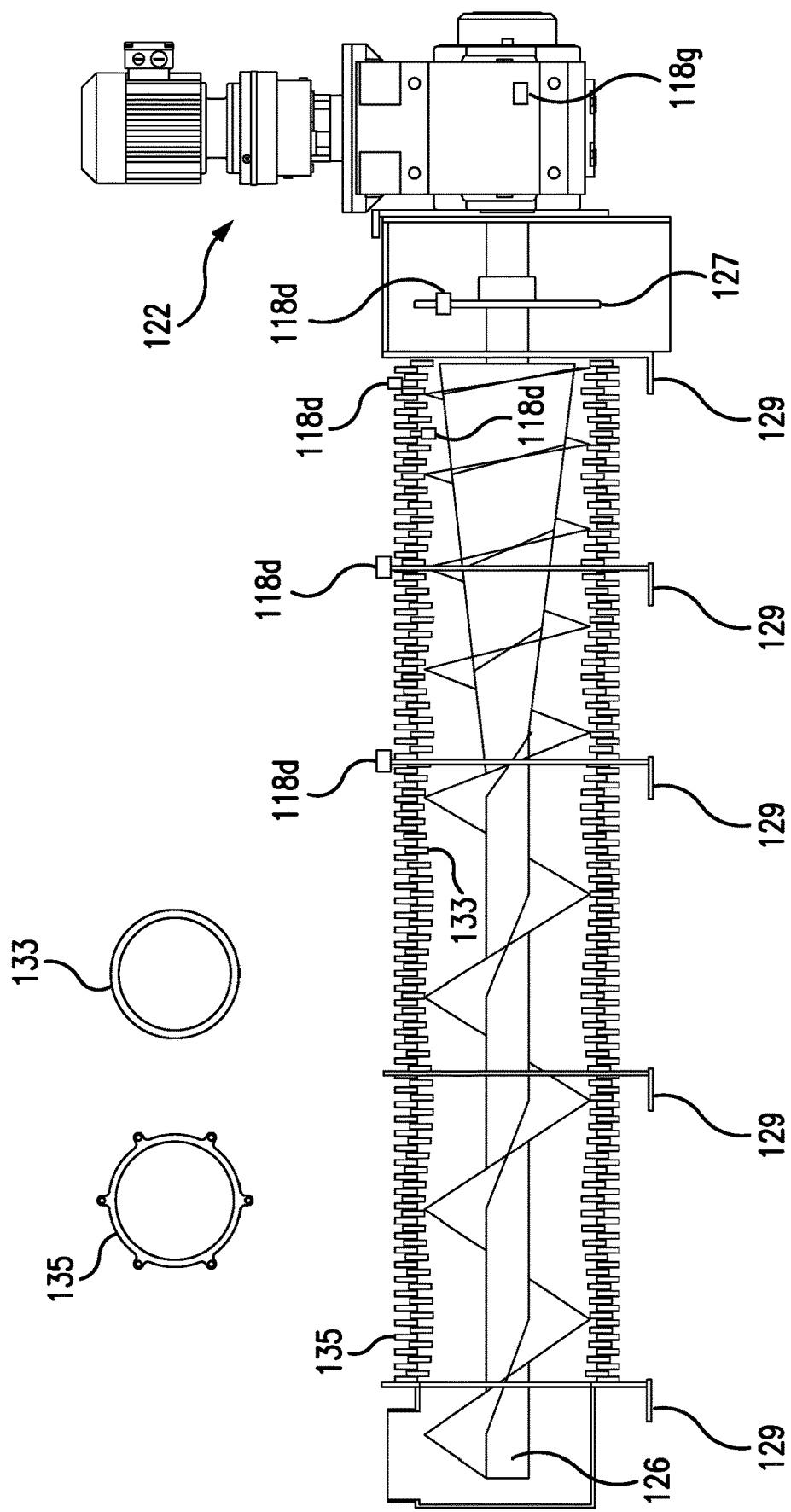
FIG. 2 provides a graphical illustration of an embodiment of the filtration assembly of the dewatering system of FIG. 1.

As shown in FIGS. 1 and 2, sensors 118*d* are operatively connected to filtration assembly 106 and measure the hydraulic and/or solids loading of filtration assembly 106. This can be done directly, e.g. with stress and/or strain sensors on the filtration assembly components, but also indirectly, e.g. by measuring characteristics of a motor 122 that drives filtration assembly 106, described in more detail below. In accordance with one embodiment, filtration assembly 106 comprises a dewatering drum 124 (e.g. cylinder) made up of an auger 126 positioned within the drum 124, and a series of spaced apart rotating and static plates, 133 and 135, respectively. Rotating and static plates 133 and 135 make up a filter screen. Sensor 118*d* measures pressure or strain of drum 124, one or more of the spaced apart plates 133 and 135 and/or auger 126. Filtration assembly 106 also includes a pressure plate 127, and/or a support frame 129, all of which can include one or more sensors 118*d*. It is contemplated that in some embodiments, instead of plates 133 and 135, a fixed screen made of wire mesh, stamped or cut metal, or similar arrangement of plastic material may be substituted. A sensor similar to sensor 118*d* can measure pressure and/or strain of the fixed screen made of wire mesh, stamped or cut metal, and/or other similar arrangement of plastic material may be substituted.

With continued reference to FIGS. 1 and 2, dewatering system includes a motor 122 operatively connected to filtration assembly 106. A sensor 118*g* is operatively connected to motor 122. Sensor 118*g* measures torque, amperage draw, rotational speed, e.g. of the motor and/or shaft, motor temperature, winding temperature, and/or power factor of motor 122. Sensors 118*g* can also measure filter mechanism rotational speed, velocity, color, ability to pass light, heat, sound or other energy through it. Control system 120 determines whether drum 124 can turn safely based on signals from sensors 118*d* and 118*g*, and will send an adjustment signal or modify the performance characteristics of drum 124 so that it can operate safely. If a sensor signal from any part of filtration assembly 106 or motor 122 indicates a jam or indicates that a jam is likely to occur, the adjustment signal can include an automatic jam clearing command or can temporarily and/or permanently command adjustments to running parameters of motor 122 and/or other elements of the dewatering system in response to predictive indicators that a jam is likely to occur, allowing the system to continue running without interruption. For example, on a belt press type filtration system, a light sensor underneath the belt can be used to indicate whether a jam has occurred.

With reference now to FIG. 1, a sensor 118*e* is operatively connected to solids receptacle 114 or between the solids receptacle 114 and the filtration assembly 106. For example, this can be accomplished by sensor 118*h* that includes a device for mid-air physical capture of solids falling from filtration assembly 106 for measurement by sensor 118*h*. It is also contemplated that sensor 118*h* can conduct measurement and analysis as the solids are falling past sensor 118*h* from filtration assembly 106 to solids receptacle 114. Sensors 118*e* and 118*h* measure at least one of solid content, moisture content, density, or permissivity to energy of solids that have been removed from the influent stream by filtration system 106. A sensor 118*f* is operatively connected to the effluent collector 116. Sensor 118*f* measures, directly or indirectly, an amount of suspended solids in the filtrate/effluent, or the amount of liquid or solids removed from the influent stream. Sensors 118*f* include, but are not limited to, contact or noncontact level sensors, pressure sensors, infrared, ultrasonic or microwave solids meters, turbidity or light sensors, color sensors, or some combination thereof, effects on a secondary filtration system, or fill rate of a container or containers for filtered solids or liquids.

With continued reference to FIG. 1, dewatering system 100 will adjust running parameters via control system 120 based on the various measurements received via sensor signals from one or more sensors 118*a-h* and/or analysis performed on the measurements. These adjustments are made in real-time automatically to avoid potential jams, to increase processing quantity and efficiency, or the like. The real-time automatic adjustment of control system 120 means that shut down of system 100 tends not to be required. Adjustments to system 100 are made without requiring any input or guidance from the equipment operator or any outside sensors, control panels, facility systems or aftermarket/add-on control systems beyond control signals originating from control panel 120 and sensors 118*a-h* that supply inputs to control panel 120. These running parameters include, but are not limited to, the influent feed rate to filtration system 106, chemical dosing rate of one or more chemicals provided to system 100, speed of various mechanical filtration mechanisms, such as, drums, disks, mesh or fabric belts, centrifuges, augers, rotating screens, hydraulic or pressurized air rams, pressure applied via rollers, plates, hydraulic or pressurized air rams, linear actuators or other mechanisms. These parameters also include, but are not limited to, the mixing energy or velocity via impellers, blades or other mechanisms, amount of filtrate recycled, amount, temperature or pressure of wash water, or other parameters of operation of dewatering system 100.

Control system 120 may include continuous process improvement or learning sub-systems that record alarm conditions causing system shutdown, such as excessive power draw or overflow of influent storage receptacle. If such an alarm condition is recorded, these sub-systems may modify operating parameters to take preventative actions that grow in magnitude as the shutdown condition is approached, and if additional system shutdowns are recorded. If the preventative action is successful, these sub-systems may experimentally reduce the magnitude of preventative actions to what is required to maintain an acceptable safety margin.

In accordance with another aspect, the present disclosure is directed to a method for adjusting a dewatering system, e.g. dewatering system 100, that removes liquid from an influent. The method includes determining a characteristic of an influent in at least one of an influent feed pipe, e.g. influent feed pipe 104, an influent storage receptacle, e.g. influent storage receptacle 102, or a conduit of a dewatering system, e.g. conduit 108. The method includes adjusting an operating parameter of the dewatering system based on the characteristic of the influent.

Adjusting the operating parameter of the dewatering system includes adjusting the speed of a feed pump, e.g. feed pump 103, operatively connected to the influent feed pipe, adjusting a chemical dosing provided to the system 100, e.g. to feed pipe 104, receptacle 102 or solids receptacle 114, downstream from the influent storage receptacle, and/or adjusting an influent feed rate from the influent storage receptacle to the filtration assembly. Determining characteristics of the influent, an effluent/filtrate in an effluent collector, e.g. effluent collector 116, solids in a solids receptacle, e.g. solids receptacle 114, and/or the filtration assembly includes receiving a signal from a sensor, e.g. at least one of sensors 118a-118g, operatively connected to the dewatering system. Adjusting the operating parameter of the dewatering system includes adjusting an operating parameter based on one or more characteristics of the filtration assembly, the solids in the solids receptacle or filtrate/effluent in the effluent collector. Adjusting the operating parameter of the dewatering system can include adjusting the speed of an element, e.g. auger 126, in a filtration assembly downstream from the influent storage receptacle.

Control system 120 may include continuous process improvement or learning sub-systems. These subsystems will modify operating parameters such as filtration assembly rotation speed, flow rate or chemical dosing rate experimentally to determine if a more efficient configuration is possible. If successful, these subsystems will adopt the new configuration. If unsuccessful, these subsystems will revert to the previous configuration and take further corrective action if required. When enabled, these subsystems may replace or augment the onsite calibration process that involves significant time and effort with an automated 'goal seeking' process that requires dewatering system 100 to meet specified performance criteria, or that assigns weighted values to performance characteristics such as throughput, chemical dosage levels, filtrate clarity, or dewatered solids dryness.

It is believed that the present disclosure includes many other embodiments that may not be herein described in detail, but would nonetheless be appreciated by those skilled in the art from the disclosures made. Accordingly, this disclosure should not be read as being limited only to the foregoing examples or only to the designated embodiments.

What is claimed is:

1. A dewatering system for removing solids from an influent comprising:
    a filtration assembly;
    a feed pipe upstream from the filtration assembly;
    a solids receptacle downstream of the filtration assembly;
    an effluent collector adjacent to the filtration assembly in fluid communication with the filtration assembly;
    a sensor configured to sense a characteristic of at least one of an influent, an effluent or a solid; and
    a control system operatively connected to the sensor to receive a sensor signal therefrom and to generate an adjustment signal based on the sensor signal to improve the efficiency of the dewatering system, wherein the sensor is operatively connected to the filtration assembly and measures either pressure or strain, or both.

2. The system as recited in claim 1, further comprising a second sensor operatively connected to a conduit upstream from the filtration assembly and downstream from the feed pipe, and wherein the second sensor is a light sensor used to measure at least one of an amount of suspended solids in an influent, a degree of homogeneity in an influent, a degree of flocculation of solids in an influent, or a size of flocculated solid nodules in an influent.

3. The system as recited in claim 1, further comprising a second sensor operatively connected to the feed pipe and measures at least one of a density, an amount of suspended solids, turbidity, or a flow rate of an influent.

4. The system as recited in claim 1, further comprising a second sensor operatively connected to an influent storage receptacle upstream from the filtration assembly and downstream of the feed pipe, wherein the second sensor is at least one of a level sensor, turbidity sensor or reflectivity sensor.

5. The system as recited in claim 1, further comprising at least one of a feed pump, a valve or a weir operatively connected to the feed pipe to draw influent into the influent storage receptacle.

6. The system as recited in claim 1, wherein the filtration assembly includes a drum, an auger positioned within the drum, and a series of spaced apart plates, wherein the sensor measures at least one of pressure or strain of the drum, one or more of the spaced apart plates or the auger.

7. The system as recited in claim 1, further comprising a second sensor operatively connected to the solids receptacle, wherein the second sensor measures at least one of solid content, moisture content, density, or permissivity to energy.

8. The system as recited in claim 1, further comprising a second sensor operatively connected between the filtration assembly and the solids receptacle, wherein the sensor measures at least one of solid content, moisture content, density, or permissivity to energy.

9. The system as recited in claim 1, further comprising a second sensor operatively connected to the effluent collector, wherein the second sensor measures at least one of an amount of suspended solids, turbidity, color, density, or interruption of a light or laser beam in effluent discharged from the filtration assembly.

10. The system as recited in claim 1, further comprising a motor operatively connected to the filtration assembly and a second sensor operatively connected to the motor, wherein the second sensor measures at least one of torque, amperage draw, rotational speed, temperature or power factor of the motor.

11. A method for adjusting a dewatering system that removes liquid from an influent, the method comprising:
determining a characteristic of at least one of an influent, an effluent or a solid in a dewatering system; and
adjusting an operating parameter of the dewatering system based on the characteristic of at least one of the influent, the effluent or the solid in the dewatering system, and
determining a characteristic of a filtration assembly downstream from a conduit by receiving signal from a sensor operatively connected to a filtration assembly, wherein the signal is indicative of stress or strain, or both, wherein adjusting the operating parameter of the dewatering system includes adjusting the operating parameter based on the characteristic of the filtration assembly.

12. The method as recited in claim 11, wherein adjusting the operating parameter of the dewatering system includes adjusting a chemical dosing provided to the dewatering system.

13. The method as recited in claim 11, wherein adjusting the operating parameter of the dewatering system includes adjusting an influent feed rate from an influent storage receptacle to a filtration assembly downstream from the influent storage receptacle.

14. The method as recited in claim 11, wherein adjusting the operating parameter of the dewatering system includes adjusting the speed of an element in a filtration assembly downstream from an influent storage receptacle.

15. The method as recited in claim 11, wherein adjusting the operating parameter of the dewatering system includes adjusting the feed rate of an influent to the dewatering system through an influent feed pipe by adjusting at least one of (i) the speed of a feed pump operatively connected to the influent feed pipe, (ii) the opening or closing of a valve operatively connected to the influent feed pipe, or (iii) the raising or lowering of a weir operatively connected to the influent feed pipe.

16. The method as recited in claim 11, wherein determining a characteristic of the influent includes receiving a signal from a second sensor operatively connected to at least one of an influent feed pipe, an influent storage receptacle, or a conduit, wherein the second sensor is at least one of a light sensor, a level sensor, density sensor, or flow rate sensor.

17. The method as recited in claim 10, wherein determining a characteristic of the solid includes determining a characteristic of the solid in a solids receptacle downstream from the conduit by receiving signal from a second sensor, wherein the second sensor measures at least one of solid content, moisture content, density, or permissivity to energy, wherein adjusting the operating parameter of the dewatering system includes adjusting the operating parameter based on the characteristic of the solid in the solids receptacle.

18. The method as recited in claim 10, wherein determining a characteristic of the influent includes measuring at least one of torque, amperage draw, rotational speed, temperature or power factor of a motor operatively connected to the dewatering system.

19. A dewatering system for removing solids from an influent comprising:
a filtration assembly;
a feed pipe upstream from the filtration assembly;
a solids receptacle downstream of the filtration assembly;
an effluent collector adjacent to the filtration assembly in fluid communication with the filtration assembly;
a sensor configured to sense a characteristic of at least one of an influent, an effluent or a solid; and
a control system operatively connected to the sensor to receive a sensor signal therefrom and to generate an adjustment signal based on the sensor signal to improve the efficiency of the dewatering system, wherein the filtration assembly includes a drum, an auger positioned within the drum, and a series of spaced apart plates, wherein the sensor measures at least one of pressure or strain of the drum, one or more of the spaced apart plates or the auger.

* * * * *